United States Patent
Spyrou et al.

(10) Patent No.: US 12,152,102 B2
(45) Date of Patent: Nov. 26, 2024

(54) PROCESS FOR PRODUCING SOLID POLYURETHANE CURING AGENTS

(71) Applicant: Evonik Operations GmbH, Essen (DE)

(72) Inventors: Emmanouil Spyrou, Schermbeck (DE); Andrea Henschke, Dülmen (DE); Elke Gollan, Herne (DE); Nicole Fresmann, Haltern am See (DE); Jessika Schüller, Gunderath (DE)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 17/960,735

(22) Filed: Oct. 5, 2022

(65) Prior Publication Data
US 2023/0105553 A1  Apr. 6, 2023

(30) Foreign Application Priority Data
Oct. 5, 2021 (EP) .................................. 21200910

(51) Int. Cl.
*C08G 18/80* (2006.01)
*C08G 18/75* (2006.01)
*C08G 18/79* (2006.01)

(52) U.S. Cl.
CPC ....... *C08G 18/8012* (2013.01); *C08G 18/755* (2013.01); *C08G 18/791* (2013.01); *C08G 18/798* (2013.01); *C08G 18/8025* (2013.01); *C08G 18/8074* (2013.01)

(58) Field of Classification Search
CPC .............. C08G 18/8012; C08G 18/755; C08G 18/798; C08G 18/8025; C08G 18/8074
See application file for complete search history.

(56) References Cited

U.S. PATENT DOCUMENTS

| | | | |
|---|---|---|---|
| 4,119,658 A | 10/1978 | Dieterich | |
| 4,302,351 A | 11/1981 | Gras et al. | |
| 4,313,876 A | 2/1982 | Gras et al. | |
| 4,442,280 A | 4/1984 | Grogler et al. | |
| 4,667,008 A * | 5/1987 | Grogler | C08G 18/3234 528/68 |
| 4,851,531 A | 7/1989 | Halpaap et al. | |
| 5,596,066 A | 1/1997 | Laas et al. | |
| 5,621,064 A | 4/1997 | Laas et al. | |
| 5,777,061 A * | 7/1998 | Yonek | C08G 18/8087 528/45 |
| 2001/0039325 A1 | 11/2001 | Ardaud et al. | |
| 2002/0095019 A1 | 7/2002 | Gras | |
| 2005/0085615 A1 | 4/2005 | Wenning | |
| 2008/0033086 A1* | 2/2008 | Jimenez | C08G 18/8074 528/45 |

FOREIGN PATENT DOCUMENTS

| | | |
|---|---|---|
| DE | 2615876 A1 | 10/1977 |
| EP | 0165437 A1 | 12/1985 |
| EP | 0193828 A1 | 9/1986 |
| WO | 2007100399 A1 | 9/2007 |

OTHER PUBLICATIONS

European Patent Office Action for Related Application No. 22199149.0 dated Feb. 13, 2023 (7 pages, including an English statement of relevance).

* cited by examiner

*Primary Examiner* — Michael L Leonard
(74) *Attorney, Agent, or Firm* — Michael Best & Friedrich LLP

(57) ABSTRACT

The present invention relates to a process for producing a solid, internally and externally blocked polyurethane curing agent based on a (cyclo)aliphatic polyisocyanate, in which, in the sequence of steps a) to d),
  a) i) at least one internally blocked (cyclo)aliphatic polyisocyanate and
  ii) at least one lactam and/or at least one aliphatic alcohol are dissolved in a solvent to produce a reaction mixture,
  b) the reaction mixture is heated and reacted,
  c) the reacted reaction mixture is cooled until product precipitates, and
  d) liquid solvent and any unreacted dissolved reactants and precipitated product are mechanically separated from one another.

9 Claims, No Drawings

PROCESS FOR PRODUCING SOLID POLYURETHANE CURING AGENTS

CROSS-REFERENCE TO THE RELATED APPLICATION

This patent application claims the benefit of priority to European Application No. EP21200910.4, filed on Oct. 5, 2021, the entire contents of which are hereby incorporated by reference.

The present invention relates to a process for producing a solid, internally and externally blocked polyurethane curing agent based on a (cyclo)aliphatic polyisocyanate that can be used to cure powder coatings.

Solid, internally and externally blocked polyurethane curing agents are valuable crosslinkers for thermally crosslinkable polyurethane (PU) powder coating compositions. To achieve good external weather stability and to avoid discolouration and degradation of the finished powder coating, it is customary to avoid aromatic components in the reactants and therefore in the polyisocyanates and further reactive constituents used. Corresponding polyurethane curing agents are preferably in solid form under standard conditions (STP=0° C. and 1 bar).

When producing the corresponding internally blocked polyurethane curing agent, one or more polyisocyanates are first reacted at least partially with themselves reversibly (for example to form a uretdione) or irreversibly (for example to form an isocyanurate). Subsequently, in the case of external blocking, the internally blocked polyisocyanate obtained is at least partially reacted reversibly or irreversibly with an H-acidic compound. External blockings with an acid, an alcohol, an amine or a lactam, for example, are customary in the prior art. The now discovered process according to the invention can be used to particularly readily produce polyurethane curing agents that are based on a (cyclo)aliphatic polyisocyanate reacted partially reversibly or irreversibly with itself and that have then been reacted with an H-acidic compound selected from at least one lactam and/or at least one aliphatic alcohol.

EP 0 023 626 A1 discloses a process for producing blocked isophorone diisocyanate adducts, in which trimerized isophorone diisocyanate is reacted with ε-caprolactam in neat form or in the presence of a solvent.

DE 27 12 931 A1 describes the production of an isophorone diisocyanate that contains isocyanurate groups and that is preferably blocked with ε-caprolactam. The trimerization of the isophorone diisocyanate to give the isocyanurate can be effected in neat form or in inert organic solvents. Unreacted isocyanate is separated here (together with any solvent present) from the isocyanurate formed by way of thin-film distillation. The isocyanurate obtained is subsequently externally blocked. This reaction can also be carried out in neat form or in the presence of suitable inert solvents.

EP 0 639 598 A1 and EP 0 720 994 A2 disclose processes for producing polyaddition compounds containing uretdione groups, involving the reaction of polyisocyanates having uretdione groups, optionally further diisocyanates, diols or diols having ester groups and/or carbonate groups, and optionally further monofunctional compounds that are reactive with isocyanate groups. The reaction can be carried out in a suitable solvent that is inert towards isocyanate groups. Suitable solvents include ethyl acetate, butyl acetate, ethylene glycol monomethyl or monoethyl ether acetate, 1-methoxy-2-propyl acetate, 2-butanone, 4-methyl-2-pentanone, cyclohexanone, toluene, or mixtures thereof, and solvents such as propylene glycol diacetate, diethylene glycol dimethyl ether, diethylene glycol ethyl and butyl ether acetate, N-methylpyrrolidone and N-methylcaprolactam and mixtures thereof. On completion of reaction, any solvents included have to be separated off from the process product by means of suitable methods, for example by suction, spray drying or melt extrusion in a devolatilization screw.

EP 0 669 353 A1 describes a process for producing polyaddition products containing hydroxyl and uretdione groups, in which uretdione-isophorone diisocyanate and diol and/or chain extender are reacted with one another without solvent in an intensive kneader or in the presence of solvents. Suitable solvents include benzene, toluene, other aromatic or aliphatic hydrocarbons, ethyl acetate, ketones, chlorinated aromatic or aliphatic hydrocarbons or other inert solvents. The solvent is removed after the reaction for example using evaporation screws, film extruders or spray dryers.

DE 103 47 902 A1 discloses a process for producing polyaddition compounds containing uretdione groups, involving the reaction of a polyisocyanate component containing uretdione groups with dodecane-1,12-diol and optionally a further compound having at least one hydroxyl group. The reaction can be effected without solvent in an intensive kneader or in a solvent. Suitable solvents are benzene, toluene, other aromatic or aliphatic hydrocarbons, ethyl acetate, ketones, chlorinated aromatic or aliphatic hydrocarbons or other inert solvents. The solvent is removed after the reaction, for example using evaporation screws, film extruders or spray dryers.

The solvent-free processes for producing polyurethane curing agents have to be carried out at comparatively high temperatures so that the substances used can be processed. Common to these processes is the fact that not all powder coating curing agents can be produced with them, since the melting and softening points of the reactants are too high, their reactivities are not sufficient or the reactants or the resulting curing agent are thermally unstable.

The processes mentioned that use solvents also have disadvantages, since the removal of the solvent that is required before use of the polyurethane curing agents produced is effected essentially by distillation. They are disadvantageous in that they consume energy and time and this leads to additional thermal stress. Furthermore, corresponding processes for removing solvents from solution are complex.

U.S. Pat. No. 5,777,061 A discloses the blocking of a fluorine-containing polyisocyanate with triazole. The product is precipitated from ethyl acetate. However, the fluorine-containing polyisocyanates are not commercially available and must first be laboriously produced from, for example, hexamethylene 1,6-diisocyanate and a perfluorinated polypropylene oxide. The process disclosed in said document is therefore disadvantageous because it is too complex.

US 2001/0039325 A1 discloses the blocking of a hexamethylene diisocyanate trimer with a ring-hydroxylated aromatic compound. The product is precipitated from Solvesso 100. The blocked polyisocyanates obtained are not externally weather-stable due to the breakdown of the hydroxyaromatic component caused by the absorption of sunlight. The process disclosed in said document is therefore likewise disadvantageous because it does not lead to curing agents that are suitable for all applications.

EP 0 071 898 A1 discloses, inter alia, the reaction of 4,4'-diphenylmethane uretdione diisocyanate with butane-1,4-diol. The product is precipitated from toluene. However, the phenyl rings of the MDI dimer used lead to poor UV stability due to their aromaticity. The process disclosed in said document is therefore disadvantageous because it does not lead to curing agents that are suitable for all applications.

The problem addressed by the present invention is thus that of avoiding the disadvantages mentioned.

The present invention provides a process for producing a solid, internally and externally blocked polyurethane curing agent based on a (cyclo)aliphatic polyisocyanate, in which, in the sequence of steps a) to d), i) at least one internally blocked (cyclo)aliphatic polyisocyanate and
ii) at least one lactam and/or at least one aliphatic alcohol are dissolved in a solvent to produce a reaction mixture, b) the reaction mixture is heated and reacted,
c) the reacted reaction mixture is cooled until product precipitates, and
d) liquid solvent and any unreacted dissolved reactants and precipitated product are mechanically separated from one another.

The process according to the invention for producing a solid, internally and externally blocked polyurethane curing agent based on a (cyclo)aliphatic polyisocyanate preferably concerns a polyurethane curing agent that is in solid form under standard conditions (STP=0° C. and 1 bar). The term "polyurethane curing agent" is clear to those skilled in the art. Preferably, the internally blocked polyisocyanate is a uretdione or an isocyanurate.

The reactants are first dissolved in a solvent to produce a reaction mixture. The solvent is preferably one in which the polyurethane curing agent to be produced is sparingly soluble. Particularly good results are achieved when the solvent is selected from the group of the ethers.

These include both open-chain and cyclic ethers. Even more preferably, the ether is a dialkyl ether of the generic formula (I)

$$C_nH_{2n+1}-O-C_mH_{2m+1}, \qquad (I)$$

where $1 \le n \le 10$ and $1 \le m \le 10$. Processes that use corresponding dialkyl ethers are advantageous in that the reactants are readily soluble therein, but the resulting products are sparingly soluble. Particularly good yields can therefore be achieved after removal using mechanical separation processes. The ether is very particularly preferably selected from the group consisting of diisopropyl ether and methyl tert-butyl ether (MTBE).

The reactants used are at least one internally blocked (cyclo)aliphatic polyisocyanate and at least one lactam and/ or at least one aliphatic alcohol. Preferably, the internally blocked (cyclo)aliphatic polyisocyanate is a uretdione or isocyanurate of the polyisocyanate.

In the context of this invention, (cyclo)aliphatic polyisocyanates are polyisocyanates that have exclusively aliphatically and/or cyclically bonded isocyanate groups. Preferred internally blocked (cyclo)aliphatic polyisocyanates can be selected from the group consisting of the corresponding internally blocked polyisocyanates of the aliphatic polyisocyanates tetramethylene 1,4-diisocyanate, hexamethylene 1,6-diisocyanate, octamethylene 1,8-diisocyanate, decamethylene 1,10-diisocyanate, dodecamethylene 1,12-diisocyanate, tetradecamethylene 1,14-diisocyanate, 1,5-diisocyanatopentane, neopentane diisocyanate, derivatives of lysine diisocyanate, tetramethylxylylene diisocyanate (TMXDI), 2,4,4-trimethylhexane diisocyanate, 2,2,4-trimethylhexane diisocyanate, tetramethylhexane diisocyanate and the 3(4),8(9)-bis(isocyanatomethyl)tricyclo[5.2.1.0$^{2,6}$] decane isomer mixtures, and the group of the cycloaliphatic diisocyanates 1,4-diisocyanatocyclohexane, 1,3-diisocyanatocyclohexane, 1,2-diisocyanatocyclohexane, 4,4'-di(isocyanatocyclohexyl)methane, 2,4'-di(isocyanatocyclohexyl) methane, 3-isocyanatomethyl-3,5,5-trimethylcyclohexyl isocyanate (isophorone diisocyanate, IPDI), 1,3-bis(isocyanatomethyl)cyclohexane, 1,4-bis(isocyanatomethyl)cyclohexane, 2,4-diisocyanato-1-methylcyclohexane and 2,6-diisocyanato-1-methylcyclohexane.

The internally blocked (cyclo)aliphatic polyisocyanate is further preferably selected from the following blocked polyisocyanates: tetramethylene 1,4-diisocyanate, hexamethylene 1,6-diisocyanate, octamethylene 1,8-diisocyanate, decamethylene 1,10-diisocyanate, dodecamethylene 1,12-diisocyanate, tetradecamethylene 1,14-diisocyanate, 1,5-diisocyanatopentane, neopentane diisocyanate, derivatives of lysine diisocyanate, 2,4,4-trimethylhexane diisocyanate, 2,2,4-trimethylhexane diisocyanate, tetramethylhexane diisocyanate, 1,4-diisocyanatocyclohexane, 1,3-diisocyanatocyclohexane, 1,2-diisocyanatocyclohexane, 4,4'-di(isocyanatocyclohexyl)methane, 2,4'-di(isocyanatocyclohexyl) methane, 3-isocyanatomethyl-3,5,5-trimethylcyclohexyl isocyanate (isophorone diisocyanate, IPDI), 1,3-bis(isocyanatomethyl)cyclohexane, 1,4-bis(isocyanatomethyl)cyclohexane, 2,4-diisocyanato-1-methylcyclohexane and 2,6-diisocyanato-1-methylcyclohexane.

Preferably, the polyisocyanate used is an internally blocked cycloaliphatic polyisocyanate. Cycloaliphatic isocyanates have at least one cyclically bonded isocyanate group. Further preferred internally blocked cycloaliphatic polyisocyanates can be selected from the group consisting of 1,4-diisocyanatocyclohexane, 1,3-diisocyanatocyclohexane, 1,2-diisocyanatocyclohexane, 4,4'-di(isocyanatocyclohexyl) methane, 2,4'-di(isocyanatocyclohexyl)methane, 3-isocyanatomethyl-3,5,5-trimethylcyclohexyl isocyanate (isophorone diisocyanate, IPDI), 1,3-bis(isocyanatomethyl) cyclohexane, 1,4-bis(isocyanatomethyl)cyclohexane, 2,4-diisocyanato-1-methylcyclohexane and 2,6-diisocyanato-1-methylcyclohexane.

Even further preferably, the polyisocyanate used is an internally blocked polyisocyanate of a polyisocyanate having at least one cyclically and at least one acyclically aliphatically bonded isocyanate group. A very particularly preferred blocked polyisocyanate is an internally blocked isophorone diisocyanate. Particularly preferably, uretdione-isophorone diisocyanate or a polyisocyanate having isocyanurate structures based on isophorone diisocyanate is used.

Furthermore, preference is given to using i) an isocyanurate group-containing polyisocyanate and a lactam (cf. Example 1) or ii) a uretdione group-containing polyisocyanate and an alcohol (cf. Example 2).

If a lactam is used in the process according to the invention, use may in principle be made of all lactams known in the prior art. If an aliphatic alcohol is used in the process according to the invention, use may in principle be made of any aliphatic alcohol known in the prior art.

Particularly readily precipitable polyurethane curing agents are the result, however, if lactam and/or aliphatic alcohol are selected from the group consisting of ε-caprolactam, ethylene glycol, propane-1,2-diol, butylene glycol (preferably butane-1,4-diol), pentanediol (preferably pentane-1,5-diol), hexanediol (preferably hexane-1,6-diol), heptanediol (preferably heptane-1,7-diol), octanediol (preferably octane-1,8-diol), nonanediol (preferably nonane-1,9-diol), decanediol (preferably decane-1,10-diol), undecanediol (preferably undecane-1,11-diol), dodecanediol (preferably dodecane-1,12-diol), trimethylolpropane, and the OH-terminated oligoesters of the aforementioned diols (ethylene glycol, propane-1,2-diol, butylene glycol, pentanediol, hexanediol, heptanediol, octanediol, nonanediol, decanediol, undecanediol, dodecanediol) with dicarboxylic acids having 4 to 12 carbon atoms (in particular butanedioic acid, maleic acid, fumaric acid, pentanedioic acid, hexanedioic acid, heptanedioic acid, octanedioic acid, nonanedioic acid, decanedioic acid, undecanedioic acid and dodecanedioic acid).

Step a) is typically carried out at temperatures from room temperature (RT, 20° C.) to 30° C. Preferably, in step a), the solvent is initially charged, then polyisocyanate is added and subsequently admixed with lactam and/or alcohol.

A catalyst can also be added. In principle, it is possible to use all catalysts that are customary in polyurethane chemistry. A preferably usable catalyst is DBTL.

There is typically only little, if any, reaction in step a). It is for this reason that the reaction mixture obtained is heated and reacted in step b). The heating is preferably effected to temperatures of 35 to 90° C., further preferably to temperatures of 40 to 75° C. The reaction is then preferably effected over a period of one hour to two days. Optionally, the heating can be discontinued after a certain time (typically after about 4 to 12 hours) and the reaction can be continued without heating, for example by stirring.

After the reaction has ended, the reacted reaction mixture is cooled in step c) until product precipitates. This preferably involves bringing the reacted reaction mixture to room temperature. In principle, however, it can also be brought to temperatures below room temperature by further cooling with ice or the like or to temperatures slightly above room temperature by cooling to a lesser extent.

In step d), liquid solvent and any unreacted dissolved reactants and precipitated product are then mechanically separated from one another. This removes the majority of the solvent, preferably at least 95% by weight, further preferably at least 98% by weight, of the solvent used. Decantation, filtration (including suction filtration) and centrifugation are preferred mechanical separation processes. Liquid solvent and any unreacted dissolved reactants and precipitated product are therefore preferably separated from one another by means of decantation, filtration or centrifugation. The product obtained can then be freed of the residual solvent using the customary processes (heat treatment at elevated temperature, preferably at 60-130° C., further preferably at 90-110° C.).

The process according to the invention may further preferably also have up to two further steps e) and/or f), in which e) the precipitated product is freed of adhering solvent and/or f) the liquid solvent and any unreacted dissolved reactants are recycled.

EXAMPLES

Example 1

Precipitation of an Isocyanurate-Containing Polyurethane Curing Agent from Diisopropyl Ether 170.5 g of Vestanat T 1890 (Evonik Industries AG) is dissolved in 1000 g of diisopropyl ether at 24° C. (over about 30 min.). The result is a clear solution. 79.5 g of ε-caprolactam is added to the solution, likewise at 24° C. (over about 30 min.). No exothermic reaction is apparent at 24° C. The mixture is heated to 70° C.
  a) Turbidity results after about 1.5 h at 70° C.
  b) A highly viscous sediment results after about 5 h at 70° C. and 16 h at RT (overnight without stirring).
  c) A solid has precipitated after about 10 h at 70° C. and 32 h at RT.

For workup, the solvent is decanted off from the solid obtained in variant c). The product is heat-treated for about 5 hours at 100° C. so as to completely remove the solvent.
  Yield: about 80%
  Analysis: NCO free: <0.5%
    GC (solvent): 0.7%

Example 2

Precipitation of a Uretdione-Containing Polyurethane Curing Agent from MTBE 144.4 g of Vestanat BF 3780 (Evonik Industries AG, NCO free: 17.5%) is dissolved in 578 g of MTBE at 30° C. within about 1 hour. The result is a clear solution. 0.02 g of DBTL is then added. Subsequently, a solution consisting of 55.6 g of an oligoester (produced from pentanediol and adipic acid (2:1) by polycondensation at 180° C. and removal of the resulting water via a distillation; OH number 709) in 222 g of MTBE is added dropwise within 45 minutes. No exothermic reaction is apparent at 30° C. The mixture is heated to 45° C.
  a) Slight turbidity is apparent after 1 h at 45° C.
  b) Phase formation results without stirring after about 3 h at 45° C. and 16 h at RT (overnight).
  c) Significant turbidity can be observed after about 5 h at 45° C. and 16 h at RT (NCO free: 0.12%(0.6% at 100% strength)).
  d) Phase formation results without stirring after about 8 h at 45° C. and RT (overnight): both phases cloudy, lower phase (product) viscous.

For workup, the upper solvent phase is decanted off from the viscous product obtained in variant d). The product phase is subsequently heat-treated for about 3 hours at 100° C. so as to completely remove the solvent.
  Yield: about 80%
  Analysis: NCO free: th. 0% act. 0%
    Total NCO: th. 12.3% act. 12.1%
    GC (solvent): <0.3%

The invention claimed is:

1. A process for producing a solid, internally and externally blocked polyurethane curing agent based on a (cyclo) aliphatic polyisocyanate, in which, in the sequence of steps a) to d),
  a) i) at least one internally blocked (cyclo)aliphatic polyisocyanate,
    wherein the internally blocked (cyclo)aliphatic polyisocyanate is an internally blocked cycloaliphatic polyisocyanate formed from only polyisocyanates having at least one cyclically and at least one acyclically aliphatically bonded isocyanate group, and
  ii) at least one lactam and/or at least one aliphatic alcohol are dissolved in a solvent to produce a reaction mixture,
    wherein the solvent is an ether selected from a group consisting of a diisopropyl ether and a methyl tert butyl ether,
  b) the reaction mixture is heated and reacted,
  c) the reacted reaction mixture is cooled until product precipitates, and
  d) liquid solvent and any unreacted dissolved reactants and precipitated product are mechanically separated from one another.

2. The process according to claim 1, wherein the internally blocked (cyclo)aliphatic polyisocyanate is a uretdione or isocyanurate.

3. The process according to claim 1, wherein the polyisocyanate used is an internally blocked polyisocyanate of isophorone diisocyanate.

4. The process according to claim 1, wherein the reactants are
   i) an isocyanurate group-containing polyisocyanate and a lactam or
   ii) a uretdione group-containing polyisocyanate and an alcohol.

5. The process according to claim 1, wherein the lactam and/or the alcohol is selected from the group consisting of ε-caprolactam, ethylene glycol, propane-1,2-diol, butylene glycol, pentanediol, hexanediol, heptanediol, octanediol, nonanediol, decanediol, undecanediol, dodecanediol, trimethylolpropane, and the OH-terminated oligoesters of the aforementioned diols with dicarboxylic acids having 4 to 12 carbon atoms.

6. The process according to claim 1, wherein in step b) after the heating the reaction mixture has a temperature of 35 to 90° C.

7. The process according to claim 1, wherein the reaction in step b) is effected over a period of one hour to two days.

8. The process according to claim 1, wherein in step d) liquid solvent and any unreacted dissolved reactants and precipitated product are separated from one another by means of decantation, filtration or centrifugation.

9. The process according to claim 1, wherein the process further comprises:
   e) the precipitated product is freed of adhering solvent and/or
   f) the liquid solvent and any unreacted dissolved reactants are recycled.

* * * * *